United States Patent [19]

Hutter et al.

[11] Patent Number: 5,216,071
[45] Date of Patent: Jun. 1, 1993

[54] HYDROXYACRYLIC MODIFIED INKS

[75] Inventors: G. Frederick Hutter, Charleston; Paul J. Zuraw, Mt. Pleasant, both of S.C.

[73] Assignee: Westvaco Corporation, New York, N.Y.

[21] Appl. No.: 967,052

[22] Filed: Oct. 28, 1992

Related U.S. Application Data

[63] Continuation-in-part of Ser. No. 923,543, Aug. 3, 1992, which is a continuation-in-part of Ser. No. 796,651, Nov. 22, 1991, abandoned.

[51] Int. Cl.$^5$ .................. C08G 63/48; C08L 33/14; C09D 11/08
[52] U.S. Cl. .................. 525/54.44; 524/272; 106/30 R
[58] Field of Search .............. 106/30 A, 30 B, 30 C, 106/30 R; 524/272; 525/54.44

[56] References Cited

U.S. PATENT DOCUMENTS

| | | | |
|---|---|---|---|
| 2,994,635 | 8/1961 | Reaville et al. | 162/179 |
| 3,929,701 | 12/1975 | Hall et al. | 260/23 ST |
| 4,151,146 | 4/1979 | Patella | 260/29.6 T |
| 4,618,640 | 10/1986 | Tsuchida et al. | 524/272 |
| 4,973,617 | 11/1990 | Incontro et al. | 524/187 |

FOREIGN PATENT DOCUMENTS 1278585 11/1989 Japan.

Primary Examiner—Joseph L. Schofer
Assistant Examiner—Wu C. Cheng
Attorney, Agent, or Firm—Daniel B. Reece, IV; Terry B. McDaniel; Richard L. Schmalz

[57] ABSTRACT

The invention is water-based printing inks and coatings formulated with stable low viscosity grind bases made from modified rosin grinding resins. These grinding resins are produced via the fusion esterification of fortified rosin with hydroxyacrylic resins and various polyols. Suitable hydroxyacrylic resins are prepared by copolymerizing an hydroxyalkylacrylate or methacrylate with alkyl acrylates, cycloalkyl acrylates, methacrylates, or styrene. These hydroxyacrylic resins can be made to contain a wide range of molecular weights and hydroxyl contents, thereby permitting formulation of a wide variety of soluble grinding resins and printing inks.

7 Claims, No Drawings

HYDROXYACRYLIC MODIFIED INKS

This application is a continuation-in-part of our commonly assigned, allowed, co-pending U.S. patent application Ser. No. 07/923,543 filed Aug. 3, 1992, entitled "Hydroxyacrylic Modified Rosin Resins For Water-Based Coatings"; which, in turn, was a continuation-in-part of U.S. patent application Ser. No. 07/796,651 filed Nov. 22, 1991, and expressly abandoned on Aug. 14, 1992.

FIELD OF INVENTION

This invention relates to novel water-based inks and coatings formulated utilizing grind bases produced from hydroxyacrylic modified rosin base ink pigment grinding resins.

BACKGROUND OF THE INVENTION

Impelled by environmental concerns and increasing governmental regulations on the volatile organic content of coatings, the applications of water-based flexographic and rotogravure inks are increasing in the ink industry. A typical water-based ink system is formulated by the addition of a binder resin (usually acrylic polymer latices) to a grind base. Grind bases are prepared by using grinding resins to disperse pigments. Pigments are crystalline solids composed of agglomerates, aggregates, and primary particles which vary in size from 0.02 to 0.50 microns. During the grinding process, agglomerates and aggregates are broken down into primary particles which possess strong tendencies to reassociate in a ink. The finer the particle size of the pigment, the greater the color strength, but the more difficult the pigment becomes to disperse. Grinding resins help prevent the particles from reassociating by increasing both the electrostatic and steric repulsion between pigment particles.

An ink formulator must consider the compatibility of the various ink components when selecting the grind resins to be used. Grind bases (i.e., pigment dispersions) are let down with a variety of alkali-soluble resins or alkali-insoluble resin emulsions to achieve the properties desired for the end use of the ink. If the grind resins and the let-down resins are not compatible, the result may be pigment flocculation, viscosity increase, loss of color strength, and other problems.

Soluble maleic resins have been used for several years in water-based inks and coatings. Typically these resins are partial esters of maleated or fumarated rosin with various polyols having acid numbers greater than 140. However, when used in aqueous pigment grinding media, these traditional maleic resins exhibit a major shortcoming—the viscosities of the resultant pigment dispersions tend to be unstable over time.

It is known to correct this problem by modifying maleic resins with styrene-allyl alcohol (SAA) copolymer, thereby producing pigment grinds with stable viscosities. SAA is a hard (softening point of 95–110° C.) thermoplastic, low molecular weight polymer manufactured by the Monsanto Corporation. However, SAA copolymers have two significant disadvantages: 1) they are relatively expensive, and 2) they are currently commercially available in only two grades—RJ-100 (which has a molecular weight of 2340) and RJ-101 (which has a molecular weight of 1700). Thus, the range of maleic resins which may be formulated utilizing SAA is severely limited.

Therefore, it is the object of this invention to formulate water-based inks and coatings containing stable viscosity pigment grinds produced from soluble maleic grinding resins which are not SAA modified.

SUMMARY OF THE INVENTION

The object of this invention is met by replacing traditional SAA resins with hydroxyacrylic resins in an esterification reaction with fumarated or maleated rosin and a polyol. The hydroxyacrylic resins are produced by copolymerizing an hydroxy-alkylacrylate or methacrylate with alkyl acrylates, cycloalkyl acrylates, methacrylates, or styrene. In addition to being relatively inexpensive to make, such hydroxyacrylic resins can be prepared to contain a wide range of molecular weights and hydroxyl contents. This versatility allows formulation of a wide variety of soluble maleic resins capable of being used as grind resins or let down resins for water-based ink vehicles and inks.

DESCRIPTION OF THE PREFERRED EMBODIMENT

The process for producing the desired maleic resin comprises reacting in a fusion esterification reaction: 70–96% by weight of fumarated rosin, maleated rosin, or combinations thereof; 2–18% by weight of a polyol or combination of polyols; and 2–20% by weight of a hydroxyacrylic resin or combination of hydroxyacrylic resins. The resulting maleic resin may be utilized as a grind resin or as a let down resin, depending upon the requirements of the coating formulator.

Rosins which are suitable for use in the reaction include, but are not limited to, the following:
  wood rosin,
  tall oil rosin, and
  gum rosin.

Tall oil rosin is preferred, more preferably fortified tall oil rosin made by reacting the rosins with varying amounts of fumaric acid, maleic anhydride, or maleic acid. Fortification of rosin is well known in the art, as evidenced by U.S. Pat. No. 2,994,635, which is hereby incorporated by reference.

Polyols which are suitable for use in the reaction include, but are not limited to, the following:
  glycerol,
  sorbitol,
  pentaerythritol,
  neopentyl glycol,
  ethylene glycol,
  diethylene glycol,
  dipropylene glycol,
  polyethylene glycol, and
  combinations thereof.

Suitable polyethylene glycols and polyethylene glycol mixtures have a molecular weight in the range of 150–5,000.

Hydroxyacrylic resins suitable for use in formulating these maleic grinding resins are produced by reacting in a free radical addition polymerization reaction:
(a) 50.0–89.5 parts by weight of a member selected from the group consisting of styrene, alkyl acrylates, cycloalkyl acrylates, methacrylates, and combinations thereof where the alkyl or cycloalkyl group contains 1–18 carbon atoms,
(b) 10.0–50.0 parts by weight of a hydroxy-containing monomer, or combination of monomers, having the chemical structure:

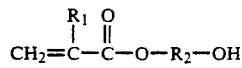

where $R_1$ is a hydrogen or methyl group and $R_2$ is a $C_2$–$C_{14}$ alkylene,
(c) 0.5–12.0 parts by weight of a peroxide or azo catalytic initiator, and
(d) up to 10.0 parts by weight of a mercaptan-containing chain transfer agent.

Suitable hydroxyacrylic polymer resins have a molecular weight in the range of 1,000–5,000. Depending on the type of solvent employed in the polymerization reaction, it may be necessary to add a chain transfer agent to achieve the desired molecular weight. (For example, chain transfer agents are not necessary when diethylene glycol, dipropylene glycol, and similar solvents are utilized.) Chain transfer agents which are suitable for use in the above reaction must contain a single mercaptan group and include, but are not limited to, the following:
dodecyl mercaptan,
mercaptoacetic acid,
mercaptopropionic acid,
octyl mercaptan,
2-mercaptoethanol, and
combinations thereof.

Catalytic peroxide or azo initiators suitable for use in the above reaction include, but are not limited to, the following:
azo-bis-isobutyonitrile,
benzoyl peroxide,
t-butyl peroctoate,
t-butyl peroxybenzoate, and
combinations thereof.

Solvents which are suitable for use in the polymerization reaction include, but are not limited to, the following:
methyl isobutyl ketone,
toluene,
ethanol,
isopropanol,
t-butanol,
diethylene glycol,
dipropylene glycol, and
combinations thereof.

In view of the teachings contained herein, it is well within the ability of a skilled artisan to utilize these solvents to produce hydroxyacrylic resins and maleic resins having different viscosities and solids levels. For ease of manipulation, it is preferable to produce hydroxyacrylic resins having a 50–80% solids level.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A hydroxyacrylic resin was produced via the following procedure. To a 500-ml flask fitted with a mechanical stirrer, reflux condenser, and two addition funnels was charged 60 g of methyl isobutyl ketone (MIBK). To the first addition funnel was charged 56.5 g of styrene, 43.5 g of 2-hydroxyethyl methacrylate, and 4.0 g of 2-mercaptoethanol. To the second addition funnel was added 20.0 g of MIBK and 2.0 g of t-butyl peroxybenzoate. The flask was heated to reflux (110° C.), and the contents of the two addition funnels were added concurrently over one hour. Refluxing was continued for three hours, after which a solution of 20.0 g of MIBK and 2.0 g of t-butyl peroxybenzoate was added over ten minutes. Refluxing was continued for three more hours. The resultant hydroxyacrylic resin solution had a solids content of 54% and a Gardner-Holt viscosity of J.

EXAMPLE 2

A hydroxyacrylic resin was produced via the following procedure. To a 500-ml flask fitted with a mechanical stirrer, reflux condenser, and two addition funnels was charged 60 g of toluene. To the first addition funnel was charged 45.5 g of styrene, 21.5 g of 2-ethylhexyl acrylate, 33.0 g of 2-hydroxyethyl methacrylate, and 6.0 g of 2-mercaptoethanol. To the second addition funnel was added 20.0 g of toluene and 2.0 g of t-butyl peroxybenzoate. The flask was heated to reflux (110° C.), and the contents of the two addition funnels were added concurrently over one hour. Refluxing was continued for three hours, after which a solution of 20.0 g of toluene and 2.0 g of t-butyl peroxybenzoate was added over ten minutes. Refluxing was continued for three more hours. The resultant acrylic resin solution (hereafter referred to as hydroxyacrylic resin no. 1) had a solids content of 53% and a Gardner-Holt viscosity of K.

A series of hydroxyacrylic resins were prepared using the above procedure wherein the composition of the resins and the solvents utilized were varied. The results are listed in Table I below.

TABLE I

| | Hydroxyacrylic Resins | | | |
|---|---|---|---|---|
| Resin No. | Composition* | Solvent | % Solids | Gardner-Holt Viscosity |
| 1 | 45.5 Styrene 21.5 2-EHA 33.0 HEMA 6.0 2-ME | Toluene | 51.3 | E |
| 2 | 45.5 Styrene 21.5 2-EHA 33.0 HEMA 6.0 2-ME | Ethanol | 50.2 | A |
| 3 | 45.5 Styrene 21.5 2-EHA 33.0 HEMA 6.0 2-ME | Isopropanol | 49.9 | E |
| 4 | 45.5 Styrene 21.5 2-EHA 33.0 HEMA 6.0 2-ME | t-Butanol | 50.9 | T+ |
| 5 | 51.0 Styrene 27.0 2-EHA 22.0 HEA 6.0 2-ME | Isopropanol | 50.1 | B-C |

*2-EHA = 2-ethylhexyl acrylate
HEA = hydroxyethyl acrylate
HEMA = hydroxyethyl methacrylate
2-ME = 2-mercaptoethanol A polymer-modified maleic rosin resin was produced via the following procedure. ROSIN SS (250.0 g) was melted in a 1000-ml three-necked, round-bottomed flask. (ROSIN SS is a tall oil based rosin manufactured by Westvaco.) The flask was equipped with a Dean-Stark trap, condenser, nitrogen inlet, thermocouple, heating mantle, and heating tape. Fumaric acid (62.0 g)

was added to the molten rosin at 150° C., and this mixture was heated to 200° C. and stirred for three hours. Next, a blend of triethylene glycol (17.5 g) and glycerol (10 g) was slowly added. The reaction mixture was stirred for one hour, and then hydroxyacrylic resin no. 1 (84.9 g at 53% solids in toluene) was added. The reaction was then held at 210° C. for three hours to produce a polymer-modified rosin resin (hereafter referred to as maleic resin no 1).

A series of polymer-modified maleic rosin resins were prepared by following the above procedure and substituting the respective hydroxyacrylic resins listed in Table I. FILTREZ 5014® (a widely used SAA-containing rosin resin manufactured by the Filtered Rosin Products Corporation) was employed as a control against which the maleic resins were evaluated (via making different pH-level varnishes from the resins). The varnishes were made by mixing each respective maleic resin (35 parts), water (51.8 parts), isopropanol (7 parts), concentrated ammonium hydroxide (6 parts), and FOAMBLAST 1005 (0.2 parts) in a Waring Blender. (FOAMBLAST 1005 is a defoaming agent manufactured by the Ross Chemical Company.) The varnishes were allowed to stand overnight to let the air and foam dissipate. The results ar given in Table II below.

TABLE II

| | Maleic Resins | | Varnish | | | |
|---|---|---|---|---|---|---|
| Resin No. | Acid No. | Softening Point, °C. | No. | pH | % Solids | Gardner-Holt Viscosity |
| (Control) Filtrez 5014 | 171 | 143 | A | 8.2 | 35.4 | Z5 |
| | | | B | 8.9 | 34.8 | R− |
| 1 | 181 | 128 | A | 8.1 | 34.8 | X-Y |
| | | | B | 8.8 | 35.9 | S+ |
| 2 | 150 | 138 | A | 8.2 | 35.0 | Z |
| | | | B | 8.8 | 34.0 | M-N |
| 3 | 169 | 131 | A | 8.2 | 35.1 | X-Y |
| | | | B | 8.7 | 34.5 | N |
| 4 | 178 | 139 | A | 8.1 | 34.0 | Z2+ |
| | | | B | 8.8 | 35.4 | N |
| 5 | 181 | 132 | A | 8.3 | 34.7 | F-G |
| | | | B | 8.8 | 34.0 | E |

Half of the varnishes listed in Table II above (i.e., the B varnishes) were utilized to produce a series of grind bases via the procedures of combining 49.5 g of varnish, 50.0 g of phthalocyanine blue G.S. high-solids presscake (manufactured by Sun Chemical Company), and 0.5 g of FOAMBLAST 1005 in a Waring Blender. After five minutes of predispersion, the batch was poured in a "quicky mill" with 100.0 g of shot and placed on a Red Devil paint shaker for one hour. The grind bases were evaluated for viscosity, and the results are shown in Table III below.

TABLE III

| | | Phthalo Blue Grind Bases | | | | | |
|---|---|---|---|---|---|---|---|
| Varnish From Resin No. | Grind Base pH | Shell Cup No. | Grind Base Viscosity (sec) | | | | |
| | | | 1 Day | 8 Days | 15 Days | 22 Days | 29 Days |
| Control | 8.8 | 3 | 19 | 22 | 30 | 27 | 24 |
| | | 4 | 15 | 17 | 15 | 18 | 16 |
| 1B | 8.6 | 3 | 64 | 77 | 77 | 74 | 92 |
| | | 4 | 37 | 43 | 46 | 61 | 76 |
| 2B | 8.7 | 3 | 47 | 81 | 69 | 120 | 85 |
| | | 4 | 36 | 48 | 47 | 60 | 78 |
| 3B | 8.5 | 3 | 68 | 72 | 86 | 92 | >120 |
| | | 4 | 48 | 52 | 56 | 56 | 62 |
| 4B | 8.7 | 3 | 42 | 59 | 72 | 71 | 72 |
| | | 4 | 34 | 37 | 40 | 42 | 39 |
| 5B | 8.3 | 3 | 23 | 30 | 41 | 42 | 44 |
| | | 4 | 16 | 21 | 25 | 28 | 26 |

Water-based inks for printing on paper were produced from the grind bases described in Table III using the following formulation:

| Grind base | 60 parts by weight |
|---|---|
| JONREZ E-2003 | 40 parts by weight. |

(JONREZ E-2003 is an acrylic emulsion manufactured by Westvaco, Inc.) The hydroxyacrylic resin-based inks exhibited superior characteristics when compared to the SAA-containing control ink.

Water-based inks for printing on plastic film (such as polyethylene or polyester) were also produced from the grind bases described in Table III using the following formulation:

| Grind base | 55 parts by weight |
|---|---|
| JONREZ E-2050 | 48 parts by weight |
| JONREZ W-2320 | 5 parts by weight |
| Isopropyl alcohol | 2 parts by weight. |

(JONREZ E-2050 is an acrylic emulsion manufactured by Westvaco, Inc. JONREZ W-2320 is a wax emulsion manufactured by Westvaco, Inc.) These hydroxyacrylic resin-based inks exhibited superior characteristics when compared to the SAA-containing control ink.

Thus, as indicated in Table I a variety of hydroxyacrylic resins can be produced in a number of solvents by following the above procedures. These hydroxyacrylic resins can be utilized to produce maleic resins (Table II), grind bases (Table III), and printing inks which compare favorably with their SAA-based counterparts.

EXAMPLE 3

A hydroxyacrylic resin was produced without employing a chain transfer agent via the following procedure. To a 500-ml flask fitted with a mechanical stirrer, reflux condenser, and an addition funnel was charged 70.80 g of dipropylene glycol. To the addition funnel was charged 92.85 g of styrene, 31.40 g of hydroxyethyl acrylate, 19.45 2-ethylhexyl acrylate, and 11.50 g of t-butyl peroxybenzoate. The flask was heated to 150° C., and the contents of the addition funnel was added over a period of one hour. Heating was continued for at a temperature of 150° C. for four hours, after which the resultant hydroxyacrylic resin solution was allowed to cool.

A polymer-modified maleic rosin resin was produced using this hydroxyacrylic resin solution via the following procedure. To a 1000-ml three-necked, round-bottomed flask equipped with a Dean-Stark trap, condenser, nitrogen inlet, thermocouple, heating mantle, and heating tape was charged 400.0 g of ROSIN SS. The rosin was heated to 200° C., at which time 102.0 g of fumaric acid and one drop of ANTIFOAM A was added to the rosin. (ANTIFOAM A is a defoaming agent manufactured by Dow Corning, Inc.) This mixture was held at 200° C. and stirred for three hours, after which 16.0 g of glycerine was added. The reaction mixture was stirred at 200° C. for one hour, at which time 84.0 g of the hydroxyacrylic resin solution was added. This reaction mixture was held at 200° C. for four hours before cooling, thereby producing a polymer-modified rosin resin having an acid number of 188 and a softening point of 132° C.

EXAMPLE 4

A hydroxyacrylic resin was produced without employing a chain transfer agent via the following procedure. To a 500-ml flask fitted with a mechanical stirrer, reflux condenser, and an addition funnel was charged 56.00 g of diethylene glycol. To the addition funnel was charged 92.85 g of styrene, 31.70 g of hydroxyethyl acrylate, 19.45 2-ethylhexyl acrylate, and 11.50 g of t-butyl peroxybenzoate. The flask was heated to 150° C., and the contents of the addition funnel was added over a period of one hour. Heating was continued for at a temperature of 150° C. for four hours, after which the resultant hydroxyacrylic resin solution was allowed to cool.

A polymer-modified maleic rosin resin was produced using this hydroxyacrylic resin solution via the following procedure. To a 1000-ml three-necked, round-bottomed flask equipped with a Dean-Stark trap, condenser, nitrogen inlet, thermocouple, heating mantle, and heating tape was charged 400.0 g of ROSIN SS. The rosin was heated to 200° C., at which time 102.0 g of fumaric acid and one drop of ANTIFOAM A was added to the rosin. This mixture was held at 200° C. and stirred for three hours, after which 16.0 g of glycerine was added. The reaction mixture was stirred at 200° C. for one hour, at which time 84.0 g of the hydroxyacrylic resin solution was added. This reaction mixture was held at 200° C. for four hours before cooling, thereby producing a polymer-modified rosin resin having an acid number of 187 and a softening point of 133° C.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A water-based ink comprising ink pigments dispersed with a grinding resin let down in a binder resin emulsion, wherein said grinding resin is the fusion esterification reaction product of:
   (a) 70 to 96% by weight of a member selected from the group consisting of fumarated rosin, maleated rosin, and combinations thereof;
   (b) 2 to 18% by weight of a polyol; and
   (c) 2 to 20% by weight of a hydroxyacrylic resin comprising the free radical addition polymerization reaction product of:
      (1) 50.0–89.5 parts by weight of a member selected from the group consisting of styrene, alkyl acrylate, cycloalkyl acrylate, methacrylate, and combinations thereof, where the alkyl or cycloalkyl group contains 1–18 carbon atoms,
      (2) 10.0–50.0 parts by weight of a hydroxy-containing monomer, or combination of monomers, having the chemical structure:

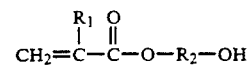

where $R_1$ is a hydrogen or methyl group and $R_2$ is a $C_2$–$C_4$ alkylene,
      (3) 0.5–12.0 parts by weight of a peroxide or azo catalytic initiator, and
      (4) up to 10.0 parts by weight of a mercaptan-containing chain transfer agent.

2. The water-based ink of claim 1 wherein said grinding resin is the fusion esterification reaction product of:
   (a) 79 to 90% by weight of a member selected from the group consisting of fumarated rosin, maleated rosin, and combinations thereof;
   (b) 2 to 12% by weight of a polyol; and
   (c) 8 to 12% by weight of a hydroxyacrylic resin comprising the free radical addition polymerization reaction product of:
      (1) 65.0–83.0 parts by weight of a member selected from the group consisting of styrene, alkyl acrylate, cycloalkyl acrylate, methacrylate, and combinations thereof, where the alkyl or cycloalkyl group contains 1–18 carbon atoms,
      (2) 15.0–35.0 parts by weight of a hydroxy-containing monomer, or combination of monomers, having the chemical structure:

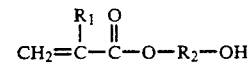

where $R_1$ is a hydrogen or methyl group and $R_2$ is a $C_2$–$C_4$ alkylene,
      (3) 2.0–10.0 parts by weight of a peroxide or azo catalytic initiator, and
      (4) up to 6.0 parts by weight of a mercaptancontaining chain transfer agent.

3. The water-based ink of claim 1 wherein said grinding resin is the fusion esterification reaction product of:
   (a) 70 to 96% by weight of a member selected from the group consisting of fumarated rosin, maleated rosin, and combinations thereof;
   (b) 1 to 9% by weight of a polyol selected from the group consisting of pentaerythritol, glycerol, sorbitol, neopentyl glycol, ethylene glycol, and combinations thereof;
   (c) 1 to 9% by weight of polyethylene glycol having an average molecular weight in the range of 100–5,000;
   (d) 2 to 20% by weight of a hydroxyacrylic resin comprising the free radical addition polymerization reaction product of:
      (1) 50.0–89.5 parts by weight of a member selected from the group consisting of styrene, alkyl acrylate, cycloalkyl acrylate, methacrylate, and combinations thereof, where the alkyl or cycloalkyl group contains 1–18 carbon atoms,
      (2) 10.0–50.0 parts by weight of a hydroxycontaining monomer, or combination of monomers, having the chemical structure:

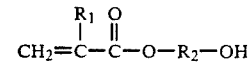

where $R_1$ is a hydrogen or methyl group and $R_2$ is a $C_2$–$C_4$ alkylene, (3) 0.5–12.0 parts by weight of a peroxide or azo catalytic initiator, and (4) up to 10.0 parts by weight of a mercaptan-containing chain transfer agent.

4. The water-based ink of claim 1 wherein said polyol is a member selected from the group consisting of glycerol, sorbitol, pentaerythritol, neopentyl glycol, ethylene glycol, diethylene glycol, dipropylene glycol, polyethylene glycol having an average molecular weight in the range of 100–5,000, and combinations thereof.

5. The water-based ink of claim 1 wherein said hydroxyacrylic resin has a molecular weight in the range of 1,000 to 5,000.

6. The water-based ink of claim 1 wherein said peroxide or azo catalytic initiator is a member selected from the group consisting of azo-bis-isobutyonitrile, benzoyl peroxide, t-butyl peroctoate, t-butyl peroxybenzoate, and combinations thereof.

7. The water-based ink of claim 1 wherein said chain transfer agent is a member selected from the group consisting of dodecyl mercaptan, mercaptoacetic acid, mercaptopropionic acid, octyl mercaptan, 2-mercaptoethanol, and combinations thereof.

* * * * *

UNITED STATES PATENT AND TRADEMARK OFFICE
CERTIFICATE OF CORRECTION

PATENT NO.   : 5,216,071
DATED        : June 1, 1993
INVENTOR(S)  : Hutter et al.

It is certified that errors appear in the above-identified patent and that said Letters Patent is hereby corrected as shown below:

In column 1, line 33, delete "a" and substitute therefor --an--.

In column 3, line 6, delete "$C_{14}$" and substitute therefor --$C_4$--.

In column 5, line 25, delete "ar" and substitute therefor --are--.

In Claim 3, column 8, line 52, after 5,000; insert --and--.

Signed and Sealed this

Fourth Day of January, 1994

BRUCE LEHMAN

Attest:

Attesting Officer

Commissioner of Patents and Trademarks